Sept. 4, 1934.    J. H. FULMER    1,972,516
ENDLESS COMB FEEDER
Filed Jan. 4, 1932    3 Sheets-Sheet 1
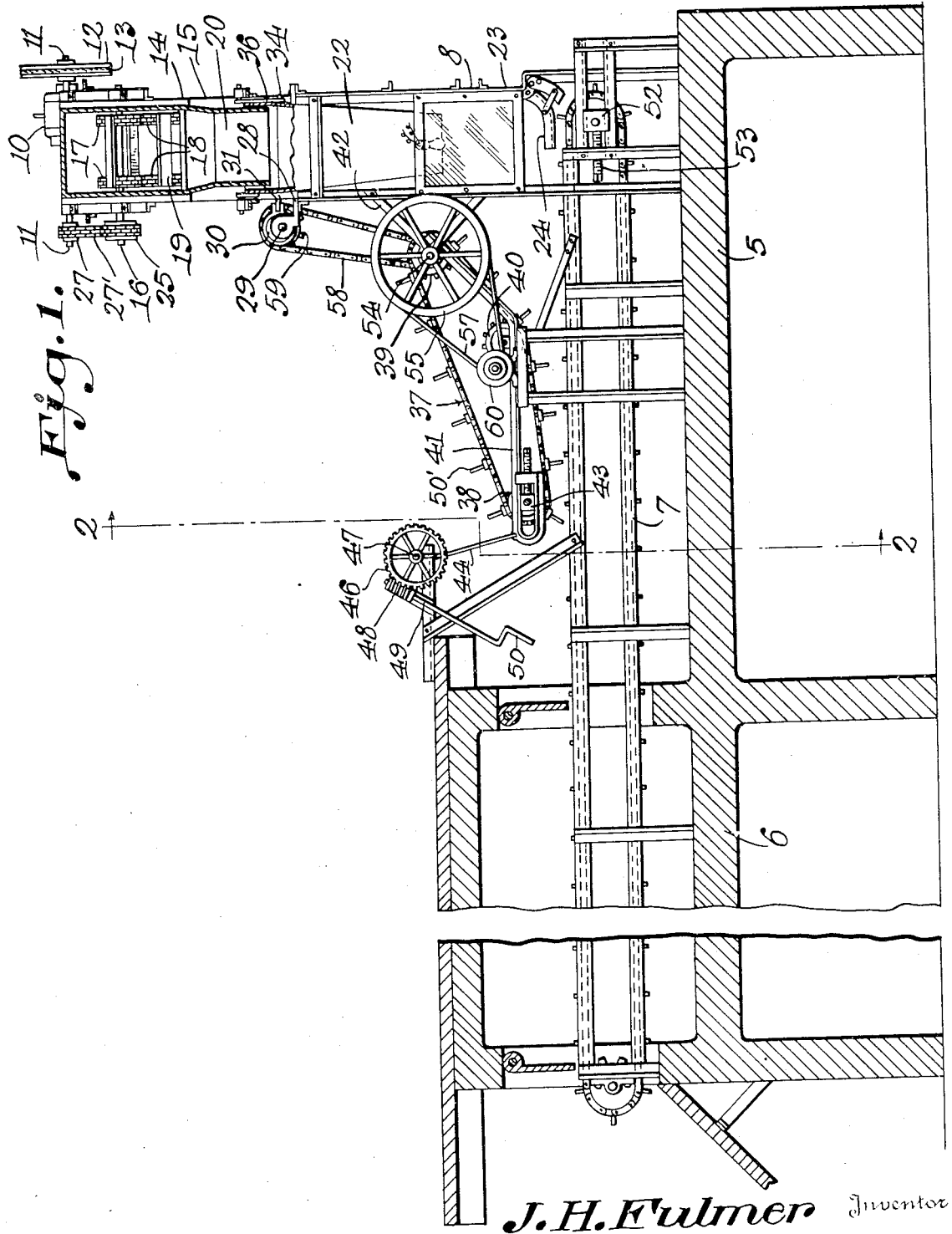
J. H. Fulmer Inventor
By C.A. Snow & Co.
Attorneys.

Sept. 4, 1934.   J. H. FULMER   1,972,516
ENDLESS COMB FEEDER
Filed Jan. 4, 1932   3 Sheets-Sheet 2
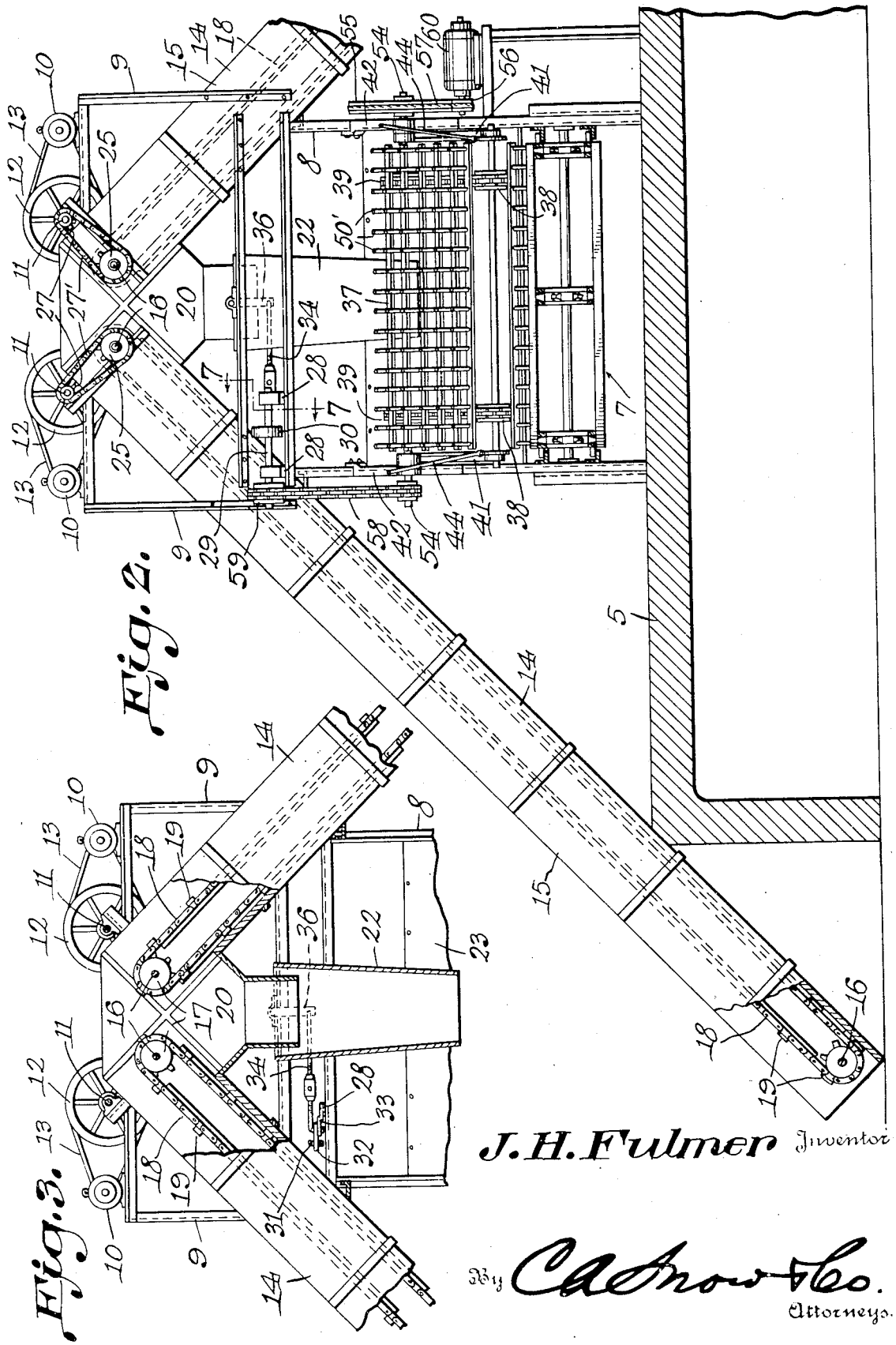

Sept. 4, 1934.    J. H. FULMER    1,972,516
ENDLESS COMB FEEDER
Filed Jan. 4, 1932    3 Sheets-Sheet 3

J. H. Fulmer Inventor

By C. A. Snow & Co.
Attorneys.

Patented Sept. 4, 1934

1,972,516

UNITED STATES PATENT OFFICE 1,972,516

ENDLESS COMB FEEDER

Joseph H. Fulmer, Nazareth, Pa.

Application January 4, 1932, Serial No. 584,677

2 Claims. (Cl. 198—161)

This invention relates to a device designed for artificially curing hay or other forage crops, the primary object of the invention being to provide a device of this character so constructed that an absolute uniform body of material may be formed to provide a ribbon or stream of even density and thickness.

An important object of the invention is to provide a device of this character so constructed that the thickness of the mass or ribbon formed by the machine may be varied to meet various conditions.

Another object of the invention is to provide a curing device wherein the conveyors and their housings are so arranged that the device will be self cleaning.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a longitudinal sectional view through a machine constructed in accordance with the invention.

Figure 2 is a sectional view taken on line 2—2 of Figure 1.

Figure 3 is an elevational view illustrating the upper ends of the elevators and distributing spout into which the elevators discharge material, the distributing spout being shown in section.

Figure 4:
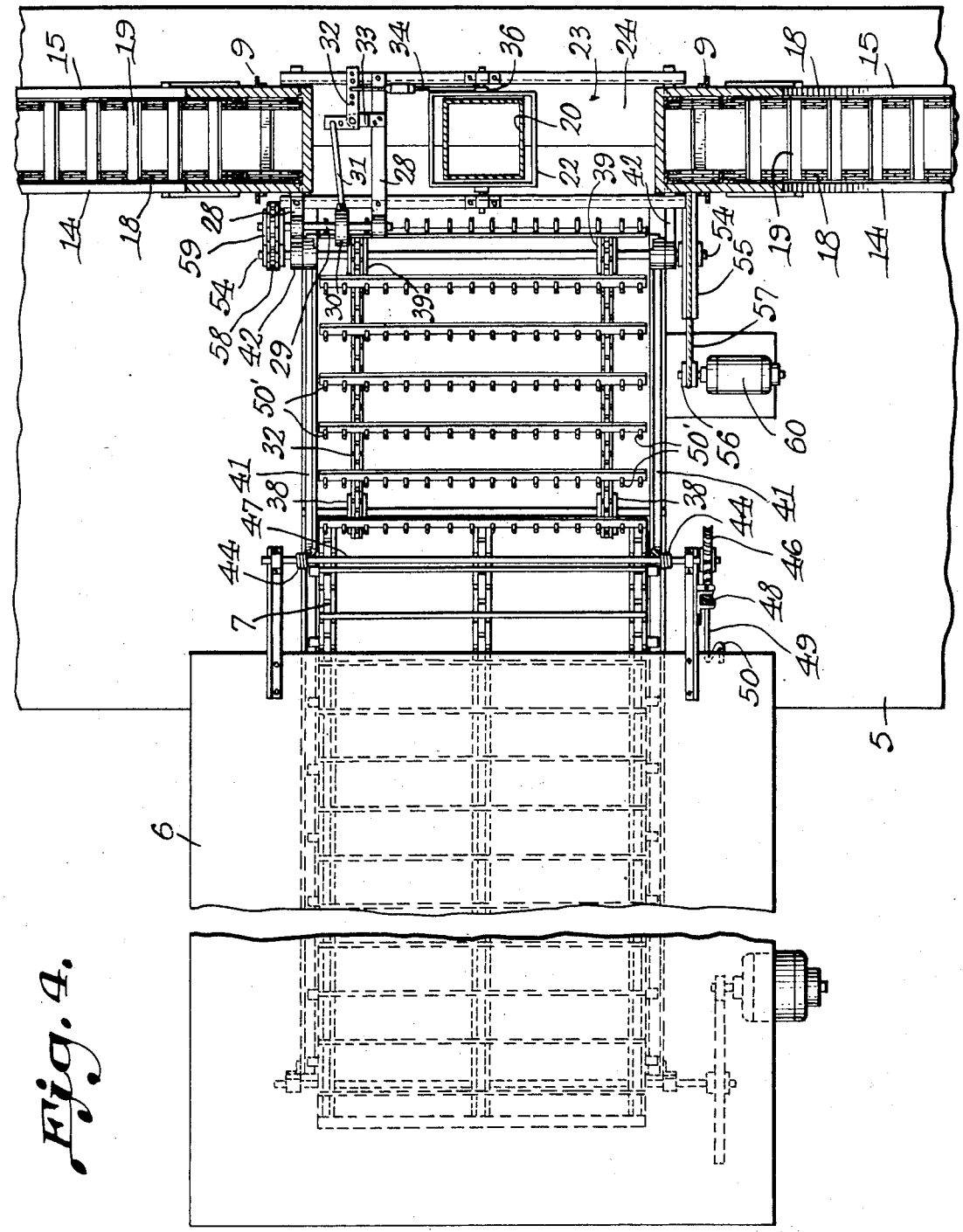

Referring to the drawings in detail, the reference character 5 designates the base on which the machine forming the essence of the invention, is mounted.

As shown more clearly by Figure 1 of the drawings, the base forms a part of the oven, which is indicated by the reference character 6, the oven being elongated and of the type shown in my Patent Number 1,788,099, granted under date of January 6, 1931.

Operating within the oven is an endless conveyor indicated by the reference character 7, which carries the material under treatment, into the oven, where the material is heated and properly cured.

The device forming the subject matter of the present invention, is mounted on the base 5, and so arranged that it will discharge material onto the endless conveyor 7, where the material is properly combed or spread, to form a ribbon of a uniform thickness.

The device embodies a frame indicated generally by the reference character 8, which frame comprises upper sections 9 that provide supports for the motors 10, shafts 11 and pulleys 12 that receive motion from the motors 10, through the belts 13.

The reference character 14 designates elevators, each of which comprises an elongated housing 15, the housing being inclined so that the lower ends thereof rest on the ground surface, while the upper ends of the elongated housings, are secured to the upper sections of the frame, the elongated housings being disposed on opposite sides of the base, and arranged so that the upper ends thereof are disposed in close relation with respect to each other.

Mounted at each end of each elevator housing, is a shaft 16 to which shafts sprockets 17 are secured, the sprockets 17 providing supports for the endless chains 18. Transverse bars 19 connect the chains, and are arranged in spaced relation with respect to each other so that hay and the usual forage crop, may be supported and carried to the upper end of the machine, by the endless conveyors.

Thus it will be seen that due to this construction, the endless conveyors will operate through the elevator housings, without danger of slipping under the weight of the material positioned thereon.

Supported within the upper section of the frame, is a hopper 20, which is formed with a spout that has its lower end disposed within the upper end of the pivoted spout 22, the spout 22 being designed to discharge material into the reserve bin 23, which has its side walls formed of glass material, to permit the material passing through the machine to be viewed, while moving to the oven or furnace.

In the lower end of the frame, and disposed directly under the reserve bin, is a curved member 24 which lies in the path of travel of material passing from the reserve bin, thereby providing means to support the weight of the material passing to the endless conveyor 7, and relieving the endless conveyor of the weight of the contents of the spout and reserve bin.

Movement is transmitted to the endless chains 18 of the elevators, through the sprockets 25 mounted on the shafts 16 at the upper ends of the elevator housings, which sprockets receive motion from the main shafts 11 through the sprockets 27 mounted thereon, and chains 27' operating over the sprockets 25 and 27.

Secured to the frame 8, are arms 28 that are formed with bearings to receive the shaft 29 on which the eccentric 30 is secured, the eccentric being connected with the rod 31, that has connection with one end of the bell crank lever 32, which bell crank lever is mounted on the arm 33 that is mounted on the frame.

Connected with the opposite end of the bell crank lever 33 is a rod 34 that extends forwardly and connects with the frame 36 in which the upper end of the pivoted spout 22 is mounted.

Openings are formed in the bell crank lever, to receive the right angled ends of the rods 31 and 34, so that movement of the rods and pivoted spout 22, may be regulated, to vary the movement of the spout, and better adapt the spout for use in treating various types and grades of materials.

Forming an important feature of the device, is the endless combing member 37, which operates over sprockets 38 and 39, the sprockets 38 and 39 being disposed at the ends of the endless combing member 37.

As clearly shown by Figure 1 of the drawings this endless combing member is supported on the arms 41 that in turn have pivotal connection with the bracket 42, so that the endless combing member may be raised or lowered, at the will of the operator.

An adjusting member indicated at 43 is provided at one end of the endless combing member, and is constructed so that the slack of the endless combing member may be eliminated. The arms 41 that support the endless combing member, are adjusted vertically by means of the cables 44 secured thereto, the cables being wound on the shaft 47 that carries the gear 46. The gear 46 is operated by the worm 48 disposed at the upper end of the rod 49, the rod being provided with a crank 50, at its lower end.

Thus it will be seen that by rotating the crank 50, the gear 46 may be rotated to raise or lower the endless combing member in such a way that the material may be evenly distributed over the endless conveyor that feeds the material into the oven or furnace.

It might be further stated that the endless combing member embodies a plurality of rows of teeth 50', that contact with the material, and spread the material over the endless conveyor 7.

Adjusting screws 53 are associated with the bearing blocks 52 in which the shaft at one end of the endless conveyor 7 operates, the adjustment being provided to remove the slack from the conveyor 7.

Rotary movement is transmitted to the shaft 54, on which sprockets are mounted, and over which sprockets the endless combing member operates through the medium of the pulley 55, motor 60 and pulley 56, there being provided a belt 57, for transmitting movement between the pulleys.

A chain 58 operates over a sprocket on the shaft 54, and also operates over the sprocket 59 that operates the shaft on which the eccentric 30 is mounted.

From the foregoing it will be obvious that due to the construction shown and described, material fed into the lower ends of the elevators 14, will be carried upwardly and deposited in the hopper 20, from where the material falls into the pivoted spout 22, and is delivered into the reserve hopper. The material is now fed onto the endless conveyor 7, which moves into the oven or furnace.

As the material passes under the combing member, the material is leveled and straightened, to the end that the material passes into the oven or furnace, in an even mass of a uniform thickness and density, and the curing of the material is accomplished with facility.

Having thus described the invention what is claimed is:

1. A device for forming forage crops into a ribbon-like mass and feeding the ribbon-like mass into a curing oven, comprising an endless conveyor operating in one direction, a combing member including endless chains, teeth extending from the chains, said combing member operating in substantially parallel spaced relation with the conveyor throughout a portion of the travel of the combing member, a portion of the travel of the combing member being at an oblique angle with respect to the endless conveyor providing a reserve chamber between the conveyor and combing member at the feed end of the conveyor, said combing member operating in a direction opposite to the direction of movement of the endless conveyor, whereby the material on the endless conveyor is combed and formed into a ribbon-like mass of a predetermined thickness.

2. A device for forming forage crops into a ribbon-like mass, comprising an endless conveyor, a combing member comprising a central shaft and end shafts, the central shaft operating at a point above the level of one of the end shafts, the shaft at the opposite end of the combing member operating at a point above the level of the central shaft, an endless member having teeth, operating over the shafts, said combing member operating at an oblique angle with respect to the endless conveyor throughout a portion of its travel, and said combing member adapted to rake material towards the receiving end of the conveyor.

JOSEPH H. FULMER.